Nov. 10, 1970  J. A. RIFF  3,539,841
PIEZOELECTRIC VOLTAGE GENERATOR
Filed Feb. 21, 1968  2 Sheets-Sheet 1

INVENTOR.
JAMES A. RIFF
BY Mueller, Aichele & Rauner
ATTORNEYS.

Nov. 10, 1970             J. A. RIFF             3,539,841
PIEZOELECTRIC VOLTAGE GENERATOR
Filed Feb. 21, 1968             2 Sheets-Sheet 2
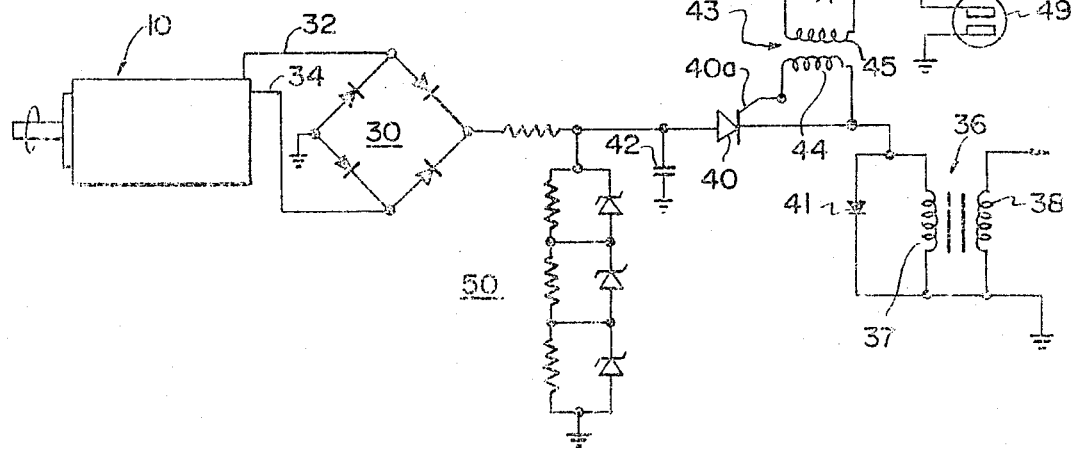
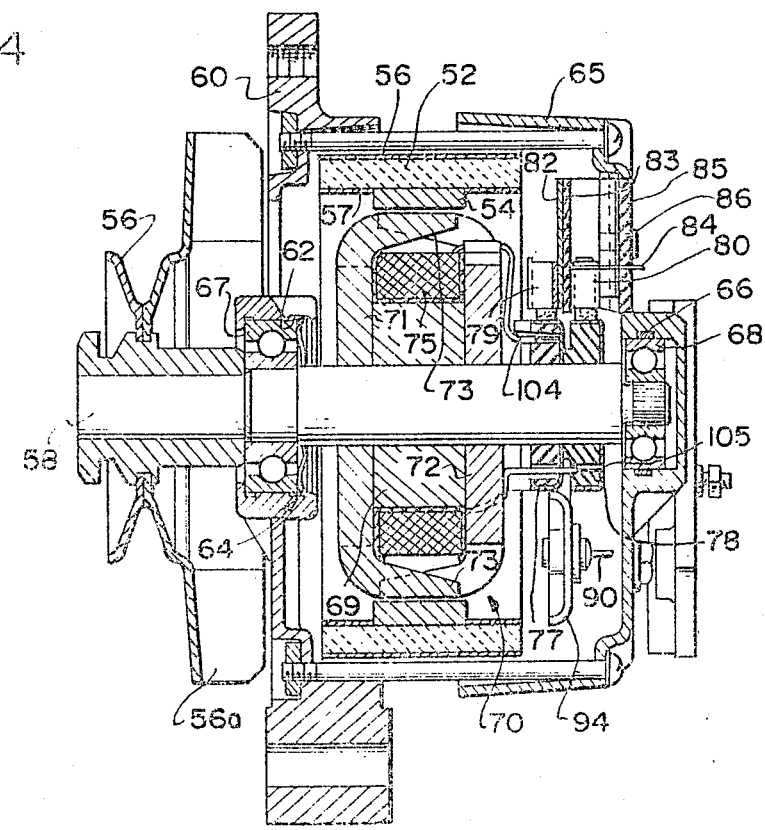
INVENTOR.
JAMES A. RIFF
BY *Mueller, Aichele & Rauner*
ATTORNEYS.

United States Patent Office 3,539,841
Patented Nov. 10, 1970

3,539,841
PIEZOELECTRIC VOLTAGE GENERATOR
James A. Riff, Chicago, Ill., assignor to Motorola, Inc.,
  Franklin Park, Ill., a corporation of Illinois
Filed Feb. 21, 1968, Ser. No. 707,248
Int. Cl. H01v 7/00
U.S. Cl. 310—8.1                              8 Claims

ABSTRACT OF THE DISCLOSURE

A dynamoelectric machine having a stator which includes a hollow cylinder made of piezoelectric ceramic material. A rotor is positioned within the ceramic cylinder and includes a magnetic structure having pole pieces and windings thereon. A plurality of magnets are connected in a spaced relation about the inner surface of the piezoelectric cylinder. The rotor rotates relative to the stator and the rotor windings cause the flux flow through the magnets of the stator to be changed thereby flexing the piezoelectric element to generate an output voltage.

BACKGROUND OF THE INVENTION

This invention pertains to dynomoelectric machines and more particularly to a unique construction using piezoelectric material to form the stator of such a machine.

Dynamoelectric machines today generally use great amounts of copper in the windings of the stator. Due to the large demand for copper and the relatively short supply thereof, the price for the material continues to spiral. In addition, a great deal of production time is required in properly winding the copper wire into stator windings. In addition, the reliability of present machines is low when operated under severe environmental conditions such as in extremely hot or humid climates.

SUMMARY OF THE INVENTION

It is an object of this invention to provide an improved and relatively inexpensive dynamoelectric machine.

It is another object of this invention to eliminate the use of copper in the stator of a dynamoelectric machine thereby reducing the cost thereof.

It is a further object of this invention to provide a dynamoelectric machine that is operable under severe environmental conditions.

In one embodiment of this invention, the stator of a dyamoelectric machine comprises a hollow, cylindrical element of piezoelectric material having a plurality of magnets connected in a spaced relation to the inner surface of the cylinder. The rotor of the machine includes a plurality of magnets positioned in the same spaced relation as the magnets on the stator. The rotor is so mounted within the cylinder that when it rotates relative to the stator the magnets theron change the flux through the stator magnets to flex the piezoelectric element thereby inducing a voltage therein. Conductive material is plated to either side of the piezoelectric element and an output circuit is connected thereto for coupling the voltage therefrom.

DESCRIPTION OF THE DRAWING

FIG. 2 is a schematic wiring diagram of an internal combustion engine capacitor discharge ignition system utilizing the dynamoelectric machine of FIG. 1;

FIG. 4 is a side elevation view in cross-section of the alternator shown in FIG. 3.

DETAILED DESCRIPTION

Figure 1:
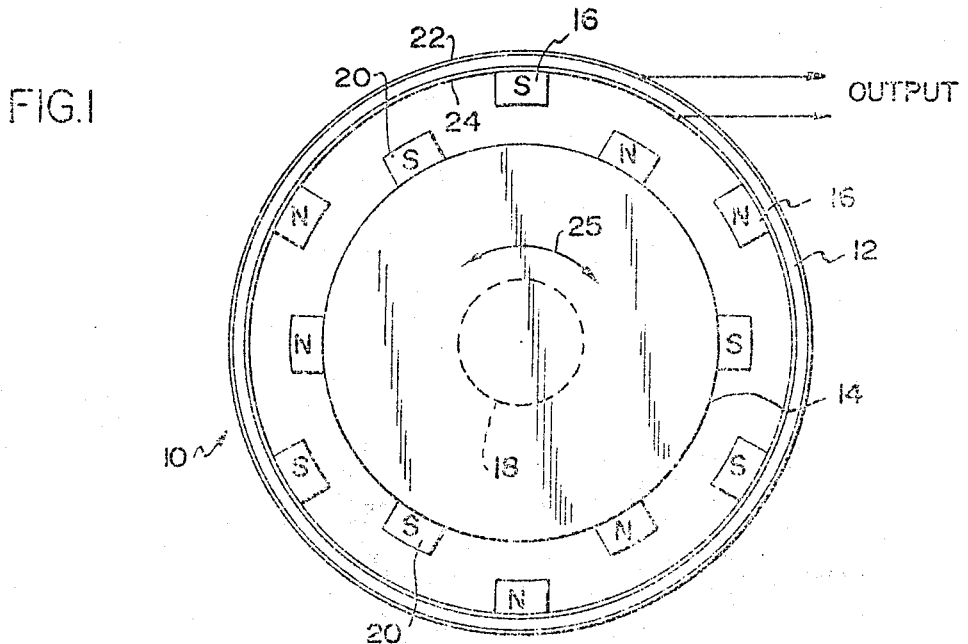
FIG. 1 is a front elevation view of a dynamoelectric machine in accordance with the principles of this invention.

Referring to the figures of the drawing, FIG. 1 illustrates a dynamoelectric machine or voltage generator 10 which has a stator 12 and a rotor 14. The stator is formed from a hollow, elongated cylinder of a piezoelectric ceramic material such as lead-magnesium niobate. Connected in a spaced relation about the inner diameter or interior surface of the ceramic element 12 are a plurality of magnets 16 of alternating polarity. The rotor 14 is positioned about a shaft 18 and is located within the ceramic cylinder 12. A plurality of magnets 20 of alternating polarity are connected about the outer peripheral surface or diameter of the rotor 14 in the same spaced relation as are the magnets 16 fixed to stator element 12. First and second layers 22 and 24 respectively of a good conductive material such as silver, are plated to the outer and inner surfaces of the ceramic cylinder 12.

In operation, the generator 10 is bi-directional and the rotor 14 is driven by a mechanical force in either direction as shown by the arrow 25. As the magnets 20 of the rotor pass in front of the magnets 16 of the stator, they change the flow of the flux through the stator magnets thereby developing hoop stresses in the cylinder to cause it to move. When the magnets are in a repelling alignment (poles of like polarity in alignment), the cylinder expands radially outwardly from the neutral position. As the magnets pass from alignment, the ceramic cylinder returns to the neutral position, until further hoop stresses are produced when magnets of opposite polarity are aligned. When this occurs, the cylinder moves radially inwardly until the magnets pass out of alignment at which time the cylinder once again returns to the neutral position. This inward and outward movement of the ceramic cylinder develops shear tensions in the cylinder to produce a sinusoidal output potential.

It should be readily apparent that other arrangements of the magnets can be resorted to for varying output potentials. For instance, if all the magnets on the stator and all the magnets on the rotor are of the same polarity, the stator is only moved radially outwardly from the neutral position thereby generating an output potential of only one polarity. Conversely, if the magnets on the stator are all one polarity, and the magnets on the rotor are all of the other polarity, when the magnets on the rotor are rotated relative to the magnets on the stator, the magnets will attract each other and the ceramic will be moved in an inwardly radial direction. The generated output voltage is of a single polarity and opposite to that polarity generated by like magnets moving the cylinder radially outwardly.

The conductive sheets 22 and 24 plated to the ceramic provide a convenient means for connecting the output circuitry to the ceramic rotor for coupling the generated potential therefrom.

FIG. 2 illustrates a practical embodiment in which the generator 10 described in connection with FIG. 1 is used. The rotor 14 of the generator 10 is driven, for instance, by the crank shaft of an internal combustion engine. An output circuit from the generator includes the full wave rectifier 30, which is connected to the conductive plates 22 and 24 of the generator 10 by the conductors 32 and 34. The ignition system for the internal combustion engine includes an ignition coil 36 having a primary winding 37 and a secondary winding 38. The secondary winding 38 may be coupled to the center post of the distributor as is well-known in the art. A silicon controlled rectifier 40 is connected in series with an ignition capacitor 42, which is across the primary winding 37 of ignition coil 36. The diode 41 is connected across the primary winding 37 and serves to reduce the amplitude of current reversals in the ignition coil secondary winding 38.

Silicon controlled rectifier 40 is triggered in synchronism with the internal combustion engine by pulses applied to the gate 40a thereof. These pulses are coupled to the gate 40a by means of a transformer 43 having a secondary winding 44 coupled between the gate 40a and the cathode of rectifier 40. Transformer 43 has a primary winding 45 which is connected through resistor 46 and ignition switch 47 to the battery 48. The opposite end of the primary winding 45 is connected to ground by intermittently operable breaker points 49. Breaker points 49 may be the well-known mechanical type breaker points synchronized with engine operation. A diode 35 connected across primary winding 45 of transformer 43 damps out reverse current transients.

When capacitor 42 is charged to the desired firing potential, and silicon controlled rectifier 40 is fired by a pulse supplied to the gate 40a, capacitor 42 discharges through primary winding 37 of ignition coil 36. This produces a high voltage pulse in secondary winding 38, which is applied to the distributor for igniting the fuel in the cylinders of the internal combustion engine. Transients which could possibly fire the silicon controlled rectifier 40 at the wrong time are damped out by the diode 35.

The capacitor 42 is charged by the generator 10 subsequent to the discharge thereof by silicon controlled rectifier 40. It is necessary that the storage capacitor be fully charged from the firing of one cylinder of the engine to the firing of the next cylinder. It is essential to properly charge the capacitor 42 that the frequency of generator 10 be relatively high, for instance, between 12 and 20 kilocycles. At high speeds this frequency is easily obtained. At low r.p.m. the proper number of magnets on the rotor and stator must be selected so that the desired frequency can be achieved. Due to the necessity of having a sufficient number of magnets to provide an output at the desired frequency at low r.p.m., the voltage output of the generator at high speeds must be limited in order to avoid damaging the ignition capacitor 42 by overcharging the same. To accomplish this, a voltage limiting network 50 comprising three Zener diodes connected in series is connected across ignition capacitor 42. In a typical operating installation the charge on capacitor 42 is in the area of 400 volts. It is, therefore, desirable to have the voltage limiting network calibrated to maintain the charge on capacitor 42 substantially in this area.

Figure 3:
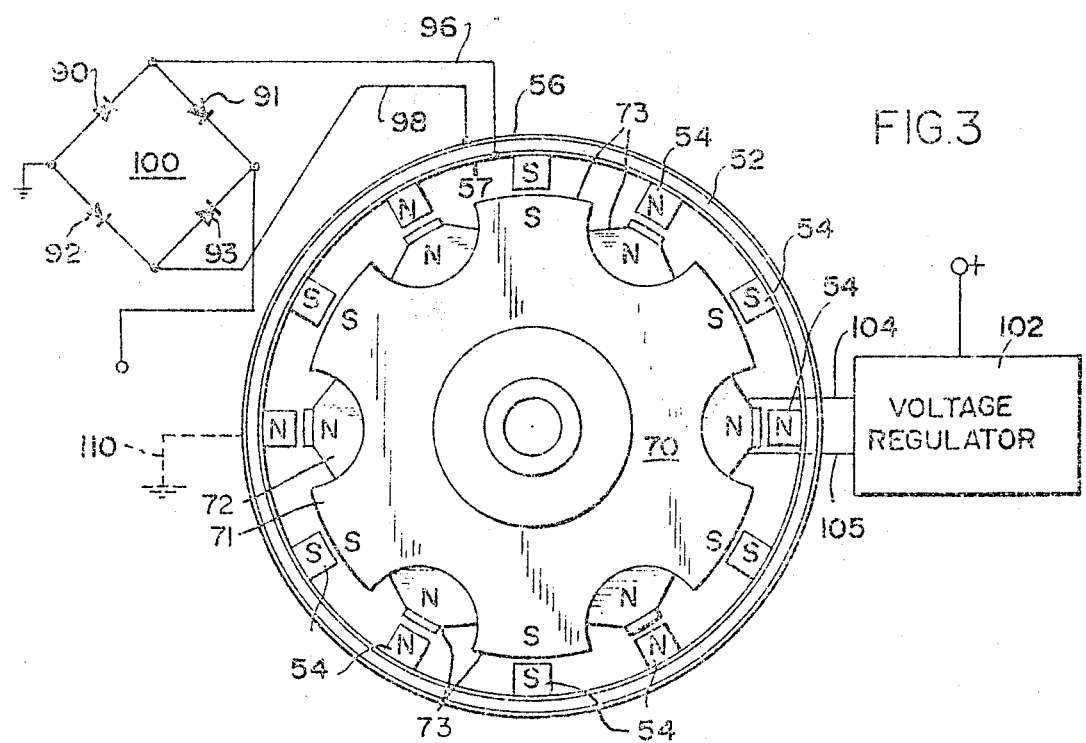
FIG. 3 is a front elevation view of an alternator for a vehicular electrical system in accordance with the principles of this invention.

FIGS. 3 and 4 illustrate an alternator for a vehicle, which utilizes the unique concept of the piezoelectric ceramic stator described in conjunction with FIG. 1. The stator structure of the alternator includes a piezoelectric ceramic, hollow, cylindrical shell 52, which has a plurality of magnets of alternating polarity 54 fixed thereto in a spaced relation about the inner surface of the cylinder. First and second conductive layers 56 and 57, which can be of silver, for example, are plated to the inner and outer surfaces of the cylinder 52.

The rotor structure of the alternator includes a support shaft 58 supported from the front frame 60 by ball bearing 67, and supported from the back frame 65 by ball bearing 68. The bearing 68 is held in place by spring washer 66 provided in a recess in the back frame 65. The front bearing 67 is held in place by a resilient C-ring 64 retained in groove 62 in the front frame 60. A pulley 56 and fan 56a which may be formed integrally with the pulley, are secured to the shaft 58. In some instances the fan 56a may not be needed because of the wide temperature range of the ceramic material, and its relatively high efficiency. Because of this, the alternator can be used in environments and under conditions, for example, extreme heat or damp and humid air, where conventional alternators cannot.

A magnetic structure is provided on the rotor 70 including an annular core 69 connected to a front pole plate 71 and back pole plate 72. Each of the pole plates has six inturned pole pieces or fingers 73 which are interleaved and interspersed with each other. A winding 75 is wound about the core 69 and is generally enclosed by the pole plates and tips 73. Winding 75 is held in position by the pole plates. The winding has end leads connected individually to slip rings 77 and 78 on the shaft 58. A pair of brushes 79 and 80 are mounted to engage individual slip rings 77 and 78. The brushes 79 and 80 are supported on a channel shaped bracket 82 connected to the back housing section 65. The brush 79 is conductively connected to the conducting bracket 82 to furnish a ground connection from the housing to one side of the rotor winding. The brush 80 is mounted on insulating plate 83 and is thereby insulated from the housing of the generator. Connection is made to the brush 80 through conducting arm 84, which extends from the brush 80. The arm 84 extends through an opening in insulating cover 85 that is secured to the back housing 65 by screws 86 and which supports both the insulating cover 85 and the bracket 82.

The exciting current for the winding 75, which forms a rotating magnetic field, is therefore applied between arm 84 and the frame of housing of the alternator which forms a reference or ground point. Two rectifiers 90 and 92 (FIG. 3), one of which (90) can be seen in FIG. 4, of one polarity are connected to a heat conducting plate 94. Two rectifiers 91 and 93 of the opposite polarity (FIG. 3) are mounted on a similar heat conducting plate symmetrically positioned with respect to the plate 94 and concealed therebehind in FIG. 4.

Operation of the alternator is similar to that described in connection with the voltage generator of FIG. 1. As the rotor 70 is rotated by the engine crankshaft, for instance, the magnetic field rotating past the magnets 54 changes the flux therein to cause the stator to be moved outwardly, back to neutral and then inwardly and back to neutral to produce sheer tensions in the ceramic cylinder thereby generating a sinusoidal output potential. Conductors 96 and 98 couple the potential from the conductive plates 56 and 57 to the full wave rectifier 100, which is comprised of the diodes 90, 91 and 92, 93. The output of the generator is used to charge the battery of the vehicle and to carry the auxiliary load in the normal manner. The voltage regulator 102 is coupled by leads 104 and 105 to the winding 75 of the rotor and controls the strength of the rotating magnetic field to regulate the output of the ceramic generator in the known manner.

In some instances it might be desirable to use only a half wave rectifier and if so, it is a simple matter to ground the outer conductive plate 56 of the stator as shown by the dotted line at 110. By grounding the outer conductive plate, the generator only has an output when it is moved in the radially inwardly direction by the rotating magnetic field.

In summary, therefore, the unique piezoelectric ceramic stator for use in dynamoelectric machines has effective noteworthy savings in the cost of such machines by eliminating costly copper windings from the stator and by reducing production time required in assembling stator windings.

I claim:

1. A power supply unit for a vehicle, including in combination, a dynamoelectric machine having stator means and rotor means, said stator means including a hollow cylindrical element of piezoelectric material and magnetic means connected in a spaced relation about said element, said rotor means including a magnetic structure having pole pieces and windings thereon, means applying direct current to said rotor winding means to provide a rotating magnetic field, said rotor means rotating relative to said stator means causing flux through said magnetic means to be changed thereby flexing said piezoelectric element to generate a voltage therein, and output circuit means including rectifier means connected to said piezoelectric element for coupling the generated voltage therefrom.

2. The power supply unit of claim 1 wherein said magnetic means includes a plurality of magnets connected in a spaced relation about the inner surface of said piezoelectric cylinder, and said pole pieces are positioned about said rotor means in the same spaced relation as said magnets.

3. The power supply unit of claim 2 wherein said output circuit means further includes first and second conductive layers plated to respective sides of said piezoelectric element.

4. A dynamoelectric machine comprising: support means; a piezoelectric element mounted to said support means and arranged to be subjected to mechanical forces to produce an electrical output therefrom; magnetic means connected to said piezoelectric element for applying a mechanical force across said piezoelectric element to produce the electrical output therefrom; means mounted to said support means and arranged to be movable relative to said piezoelectric element but always and everywhere spaced from said magnetic means connected thereto for changing the flux through said magnetic means to cause the same to flex said piezoelectric element with a mechanical force thereby producing the electrical output; and output circuit means connected to said piezoelectric element to couple the electrical output therefrom to utilization means.

5. The dynamoelectric machine of claim 4 wherein said piezoelectric element is a hollow cylindrical member, and said magnet means includes a plurality of magnets connected to said piezoelectric element in a spaced relation about the inner surface thereof, and wherein said means for changing the flux through said magnetic means includes rotor means, said rotor means being mounted in a spaced relation to said piezoelectric element and being rotatable relative thereto to change the flux through said magnets thereby flexing said piezoelectric element to produce the output voltage.

6. The dynamoelectric machine of claim 5 wherein said rotor means includes a plurality of magnetic pole pieces arranged in the same spaced relation as said magnets connected to said cylindrical member.

7. The dynamoelectric machine of claim 5 wherein said output circuit means includes first and second conductive layers respectively plated to the outer and inner surfaces of said hollow cylindrical member.

8. The dynamoelectric machine of claim 4 wherein said utilization means is a capacitor discharge ignition system for an internal combustion engine including trigger means for discharging a capacitor within the ignition systm and in synchronism with the engine to produce firing pulses in response to the trigger means.

References Cited

UNITED STATES PATENTS

| | | | |
|---|---|---|---|
| 2,945,192 | 7/1960 | Szymanski | 310—9.1 |
| 3,173,055 | 3/1965 | Harkness | 315—55 |
| 3,208,443 | 9/1965 | Hurwitz | 310—8.7 |
| 3,215,133 | 11/1965 | Farrell | 123—148 |
| 3,247,423 | 4/1966 | Nolta | 315—357 |
| 3,332,409 | 7/1967 | Hoover | 310—68 |
| 3,350,583 | 10/1967 | Schiavone | 310—8.6 |
| 3,354,327 | 11/1967 | Benson | 310—9.1 |
| 3,397,683 | 8/1968 | Phillips | 123—148 |

DONOVAN F. DUGGAN, Primary Examiner

B. A. REYNOLDS, Assistant Examiner

U.S. Cl. X.R.

123—148; 310—68, 70, 8.5, 8.7, 9.6, 254